US007607636B2

(12) United States Patent
Grandi

(10) Patent No.: US 7,607,636 B2
(45) Date of Patent: Oct. 27, 2009

(54) VALVE ASSEMBLY FOR AN INJECTION VALVE AND INJECTION VALVE

(75) Inventor: Mauro Grandi, Leghorn (IT)

(73) Assignee: Continental Automotive GmbH, Hannover (DE)

( * ) Notice: Subject to any disclaimer, the term of this patent is extended or adjusted under 35 U.S.C. 154(b) by 219 days.

(21) Appl. No.: 11/626,558

(22) Filed: Jan. 24, 2007

(65) Prior Publication Data

US 2007/0176132 A1 Aug. 2, 2007

(30) Foreign Application Priority Data

Jan. 24, 2006 (EP) ................................ 06001469

(51) Int. Cl.
*F16K 47/00* (2006.01)

(52) U.S. Cl. ................... 251/118; 251/120; 239/129.21

(58) Field of Classification Search ................. 251/120, 251/118, 129.21; 239/533.11–533.12, 533.3–533.5, 239/533.7
See application file for complete search history.

(56) References Cited

U.S. PATENT DOCUMENTS

| | | | | |
|---|---|---|---|---|
| 1,693,931 | A * | 12/1928 | Lowe | 123/297 |
| 5,810,328 | A * | 9/1998 | Boehland | 251/118 |
| 6,478,013 | B1 * | 11/2002 | Boecking | 123/467 |
| 6,719,220 | B2 | 4/2004 | Hohl | 239/533.11 |
| 6,739,525 | B2 * | 5/2004 | Dantes et al. | 239/533.12 |
| 6,857,417 | B2 | 2/2005 | Niwa | 123/467 |
| 6,857,585 | B2 * | 2/2005 | Winner | 239/533.2 |
| 6,918,550 | B2 * | 7/2005 | Luft | 239/585.1 |
| 7,438,238 | B2 * | 10/2008 | Date et al. | 239/96 |
| 2003/0047623 | A1 * | 3/2003 | Dantes | 239/533.12 |
| 2003/0071148 | A1 * | 4/2003 | Hohl | 239/585.1 |
| 2003/0136381 | A1 | 7/2003 | Dantes et al. | 123/445 |
| 2003/0155439 | A1 * | 8/2003 | Winner | 239/533.2 |
| 2004/0021010 | A1 * | 2/2004 | Hohl et al. | 239/533.11 |
| 2004/0021015 | A1 * | 2/2004 | Murdoch | 239/533.12 |
| 2006/0091240 | A1 * | 5/2006 | Achleitner et al. | 239/533.12 |
| 2007/0084949 | A1 * | 4/2007 | Augustin | 239/533.11 |
| 2007/0095949 | A1 * | 5/2007 | Kumagai et al. | 239/533.12 |

FOREIGN PATENT DOCUMENTS

| | | | |
|---|---|---|---|
| DE | 100 50 053 | A1 | 4/2002 |
| DE | 102 13 857 | A1 | 10/2003 |
| EP | 1 197 651 | A2 | 4/2002 |

* cited by examiner

*Primary Examiner*—John K Fristoe, Jr.
*Assistant Examiner*—Marina Tietjen
(74) *Attorney, Agent, or Firm*—King & Spalding L.L.P.

(57) ABSTRACT

A valve assembly (60) for an injection valve (62) has a valve body (4) including a central longitudinal axis (L), the valve body (4) has a cavity (8) with a fluid inlet portion (42) and a fluid outlet portion (44), a valve needle (10) axially movable in the cavity (6), the valve needle (10) preventing a fluid flow through the fluid outlet portion (44) in a closing position and releasing the fluid flow through the fluid outlet portion (44) in further positions, and a fluid flow directing element (46) arranged in the fluid outlet portion (44) coaxially between the valve body (4) and the valve needle (10) and extending in radial direction away from the valve needle (10) in a way that a fluid flow between the valve needle (10) and the fluid flow directing element (46) is prevented.

19 Claims, 4 Drawing Sheets

VALVE ASSEMBLY FOR AN INJECTION VALVE AND INJECTION VALVE

RELATED APPLICATION

This application claims priority from European Patent Application No. 06001469, which was filed on Jan. 24, 2006, and is incorporated herein by reference in its entirety.

TECHNICAL FIELD

The invention relates to a valve assembly for an injection valve and an injection valve.

BACKGROUND

Injection valves are in wide spread use, in particular for internal combustion engines where they may be arranged in order to dose the fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter and also various elements of the injection valve being responsible for the way the fluid is dosed may vary in a wide range. In addition to that, injection valves may accommodate an actuator for actuating a needle of the injection valve, which may, for example, be an electromagnetic actuator or piezo electric actuator.

In order to enhance the combustion process in view of the creation of unwanted emissions, the respective injection valve may be suited to dose fluids under very high pressures. The pressures may be in case of a gasoline engine, for example, in the range of up to 200 bar and in the case of diesel engines in the range of up to 2000 bar.

SUMMARY

The object of the invention is to create a valve assembly which is simply to be manufactured and which facilitates a reliable and precise function.

A valve assembly for an injection valve may comprise a valve body including a central longitudinal axis, the valve body comprising a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, and a fluid flow directing element arranged in the fluid outlet portion coaxially between the valve body and the valve needle and extending in radial direction away from the valve needle in a way that a fluid flow between the valve needle and the fluid flow directing element is prevented.

BRIEF DESCRIPTION OF THE DRAWINGS

Exemplary embodiments of the invention are explained in the following with the aid of schematic drawings. These are as follows.

Elements of the same design and function that appear in different illustrations are identified by the same reference character.

DETAILED DESCRIPTION

Figure 1:
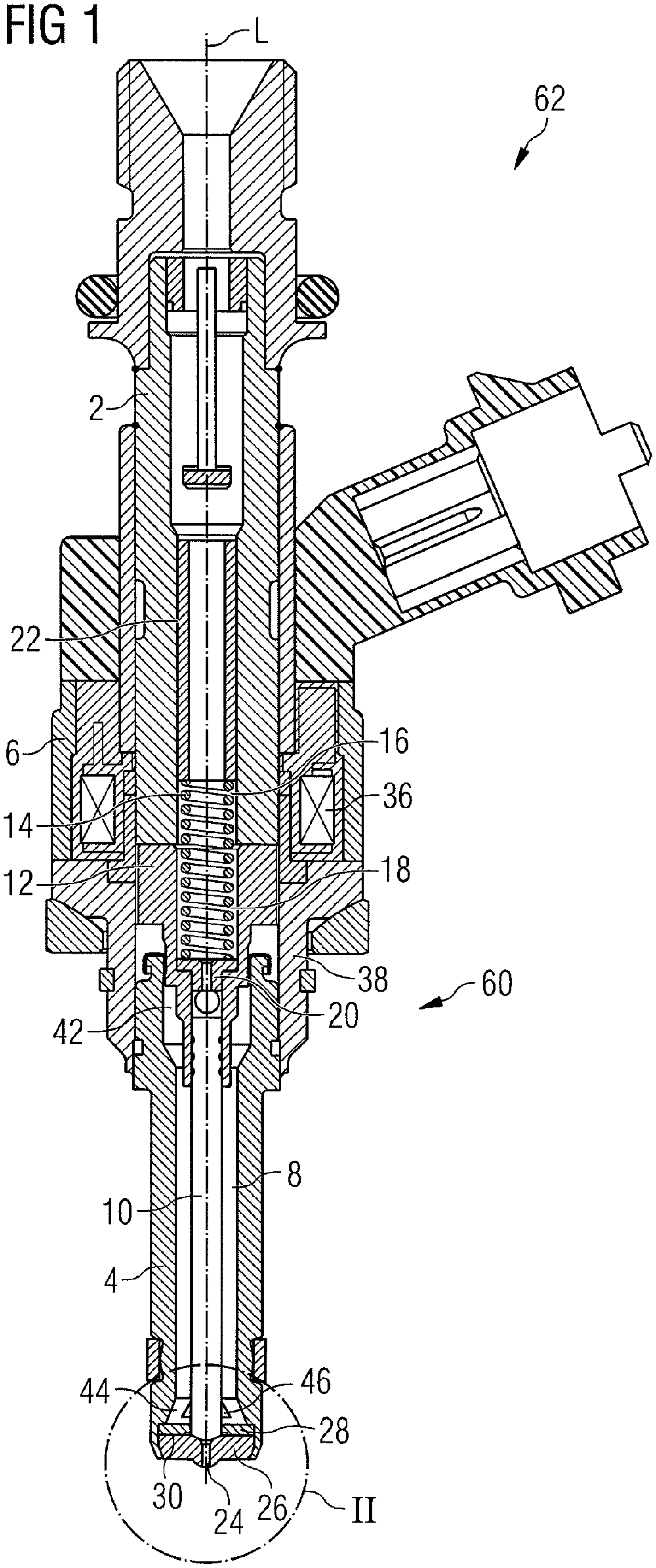
FIG. 1, an injection valve with a valve assembly in a longitudinal section view, FIG. 2, section II of the valve assembly of the injection valve according to FIG. 1 in a longitudinal section view, and FIG. 3, an enlarged view of the valve assembly of the injection valve in a longitudinal section view, illustrating a conical fluid flow directing element.
Figure 2:
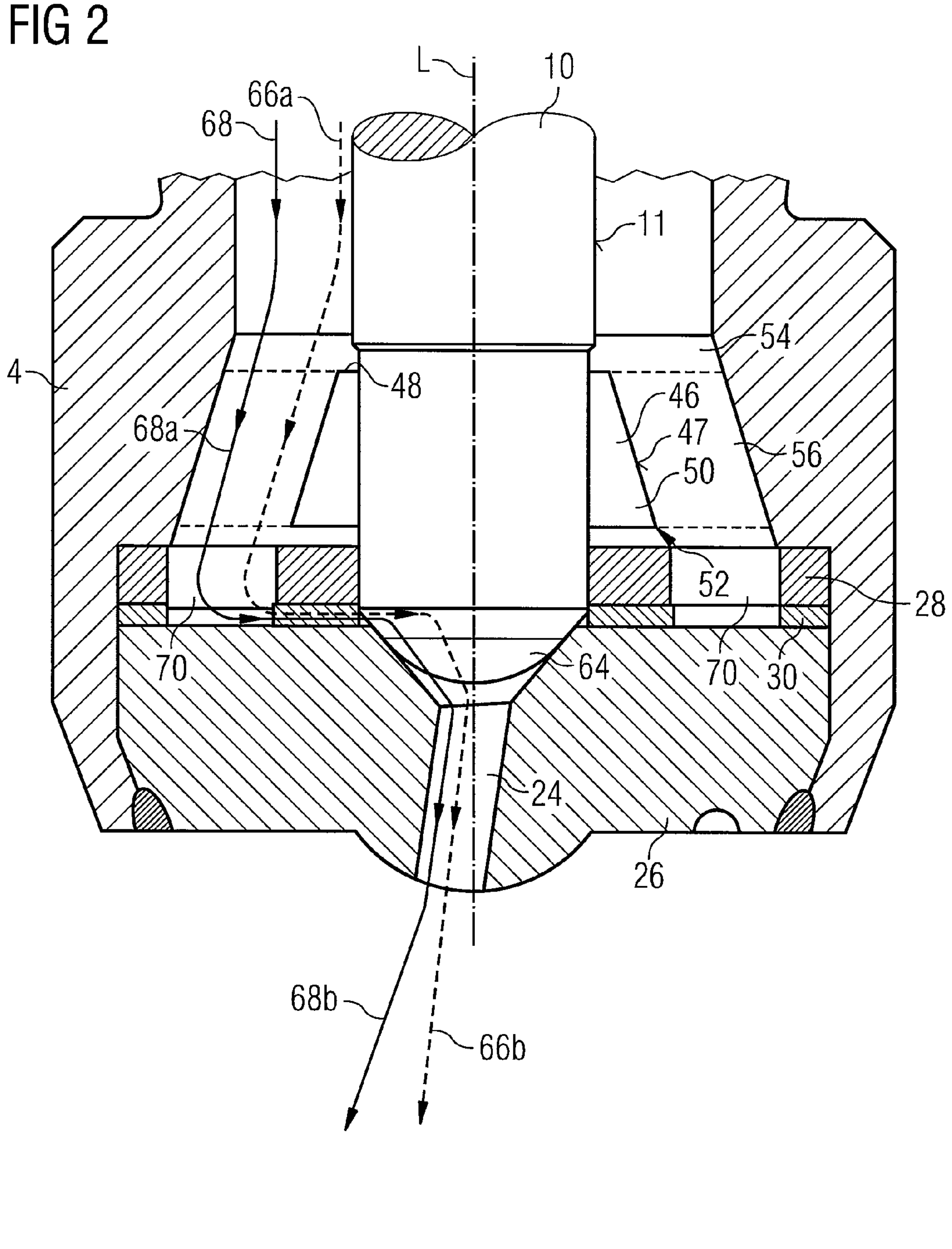
Figure 3:
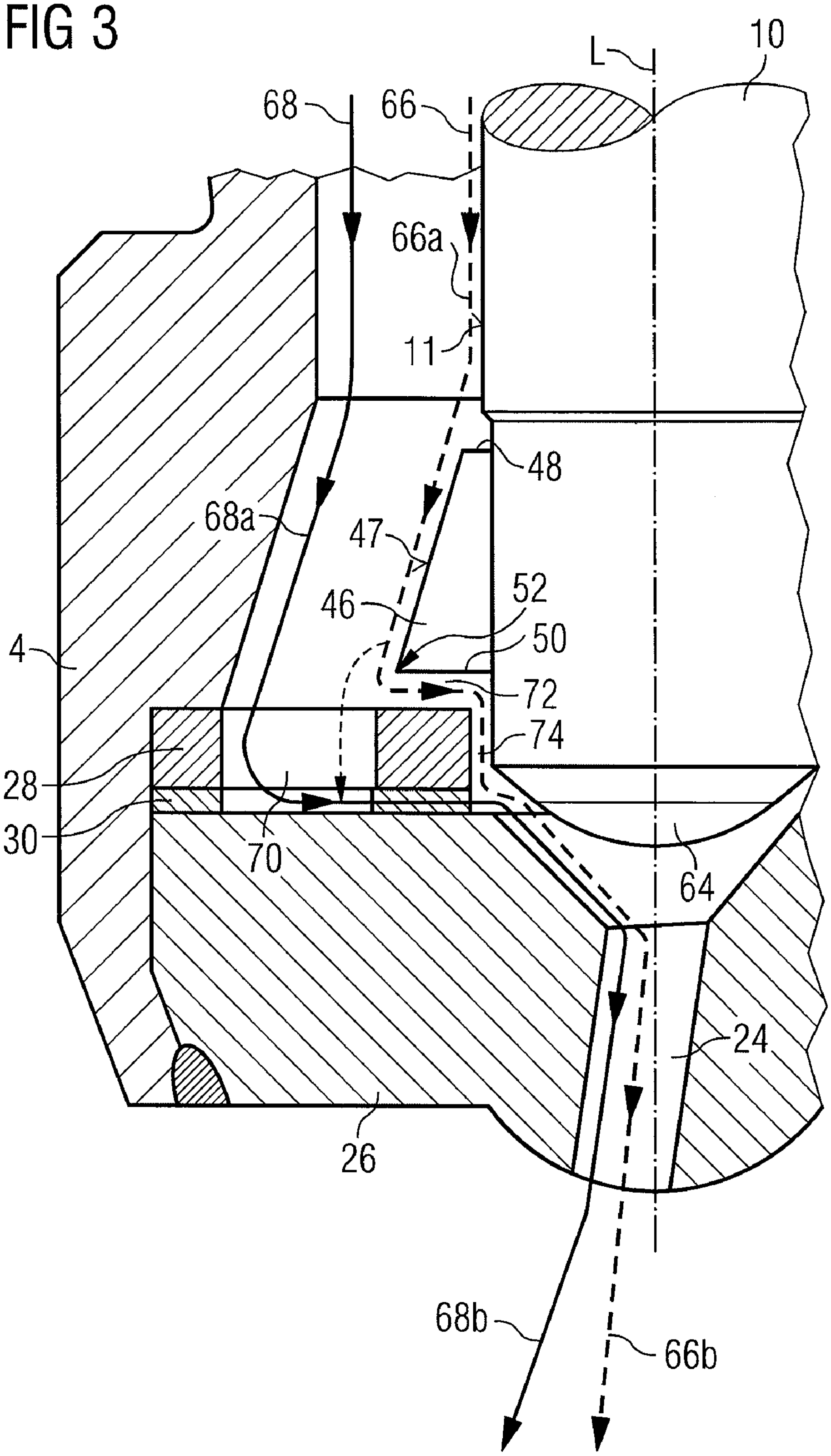

According to an embodiment, a valve assembly for an injection valve may comprise a valve body including a central longitudinal axis, the valve body comprising a cavity with a fluid inlet portion and a fluid outlet portion, and a valve needle axially moveable in the cavity, the valve needle preventing a fluid flow through the outlet portion in a closing position and releasing the fluid flow through the fluid outlet portion in further positions. Furthermore, the valve assembly comprises a fluid flow directing element arranged in the fluid outlet portion coaxially between the valve body and the valve needle and extending in radial direction away from the valve needle in a way that a fluid flow between the valve needle and the fluid flow directing element is prevented.

According to different embodiments, the characteristic of the fluid flow releasing through the fluid outlet portion can be strongly influenced by the shape of the valve assembly in the area of the fluid outlet portion. The advantage of the invention is that the fluid flow along the surface of the valve needle in the fluid outlet portion can be reduced as the fluid flow between the valve needle and the fluid flow directing element is prevented. A small fluid flow along the surface of the valve needle in the fluid outlet portion can result in that the axial component of the fluid flow releasing through the fluid outlet portion can be small as well, in particular if the fluid flow along the surface of the valve needle in the fluid outlet portion is crucial for the amount of the axial component of the fluid flow releasing through the fluid outlet portion. Consequently, the radial component of the fluid flow releasing through the fluid outlet portion can be large. This makes it possible that the fluid flow releasing through the fluid outlet portion which can be a spray can have a big spray angle and a favorable distribution of fluid droplets.

According to an embodiment, the valve assembly may comprise a first cavity section upstream the fluid flow directing element and a second cavity section extending in radial direction away from the fluid flow directing element, wherein the fluid flow directing element is coupled with the valve needle and the fluid flow directing element is shaped in a way that the fluid flow between the first cavity section to the second cavity section is directed away from the valve needle in radial direction when the valve needle releases the fluid flow.

This has the advantage that the fluid flow between the first cavity section to the second cavity section directed away from the valve needle can influence the fluid flow in a way that the fluid flow along the surface of the valve needle before being released through the fluid outlet portion can be kept very small.

According to an embodiment, the fluid flow directing element can be shaped in a way that the fluid flow upstream the second cavity section is kept away from the valve needle. By this, the fluid flow along the surface of the valve needle in the fluid outlet portion can be obtained very small.

According to an embodiment, the fluid flow directing element may have a downstream end portion which comprises an edge for directing the fluid flow. The edge of the fluid flow directing element enables directing the fluid flow in a way that the main fluid flow can be kept in a distance from the surface of the valve needle.

According to a further embodiment, the fluid flow directing element has a cylindrical shape. This can be a simple shape, which can be produced with low costs. According to an embodiment, the cylindrical shape is very effective to keep away the main fluid flow away from the surface of the valve needle.

According to a further embodiment, the fluid flow directing element may have a conical shape. Preferably, the fluid flow directing element has a bigger diameter in downstream direction. This has the advantage, that the shape of the fluid flow directing element is very simple and can be produced with very low cost. Furthermore, this shape is very effective in keeping the main fluid flow away from the surface of the valve needle.

According to a further embodiment, the fluid flow directing element can be press-fitted to the valve needle. This has the advantage, that the position of the fluid flow directing element relative to the valve needle can be defined very precisely. Furthermore, press-fitting the fluid flow directing element to the valve needle is a low cost solution.

According to a further embodiment, the valve needle and the fluid flow directing element may form a one-piece element. This allows a very precise positioning of the fluid flow directing element relative to the valve needle. Furthermore, this arrangement of the fluid flow directing element on the valve needle can be mechanically very solid.

According to an embodiment, an injection valve 62 (FIG. 1), that is in particular suitable for dosing fuel to an internal combustion engine, comprises an inlet tube 2, a housing 6 and a valve assembly 60.

The valve assembly 60 comprises a valve body 4 with a cavity 8, which takes in a valve needle 10 and preferably a part of an armature 12. The valve needle 10 has a surface 11 and a seat part 64. In the inlet tube 2 a recess 16 is provided which further extends to a recess 18 of the armature 12. A spring 14 is arranged in the recess 16 of the inlet tube 2 and/or the recess 18 of the armature 12. Preferably, it rests on a spring seat being formed by an anti-bounce disc 20. By this the spring 14 is mechanically coupled to the needle 10. An adjusting tube 22 is provided in the recess 16 of the inlet tube 2. The adjusting tube 22 forms a further seat for the spring 14 and may be axially moved during the manufacturing process of the fluid injection valve in order to preload the spring 14 in a desired way.

In a closing position of the needle 10 it sealingly rests on a seat plate 26 by this preventing a fluid flow through at least one injection nozzle 24. The injection nozzle 24 may be, for example, an injection hole. However, it may also be of some other type suitable for dosing fluid. The seat plate 26 may be made in one part with the valve body 4 or a separate part from the valve body 4. In addition to that a lower guide 28 for guiding the needle 10 is provided. Additionally, a swirl disc 30 is provided.

The fluid injection valve is provided with an actuator unit, that comprises preferably an electromagnetic actuator, comprising a coil 36, which is preferably overmolded. A valve body shell 38, the armature 12 and the inlet tube 2 are forming an electromagnetic circuit. The actuator unit may, however, also comprise another type of actuator, which is known to a person skilled in the art for that purpose. Such an actuator may be, for example, a piezoelectric actuator.

A fluid inlet portion 42 is provided in the valve body 4 which communicates with a fluid outlet portion 44 which is a part of the cavity 8 near the seat plate 26.

In the fluid outlet portion 44 a fluid flow directing element 46 with a surface 47 is arranged coaxially between the valve body 4 and the valve needle 10 and extents in radial direction away from the valve needle 10. The fluid flow directing element 46 has an upstream entrance portion 48 and a downstream end portion 50.

The fluid flow directing element 46 has a conical shape. The fluid flow directing element 46 with the conical shape can be manufactured easily. Furthermore, this shape allows a low cost solution.

Figure 4:
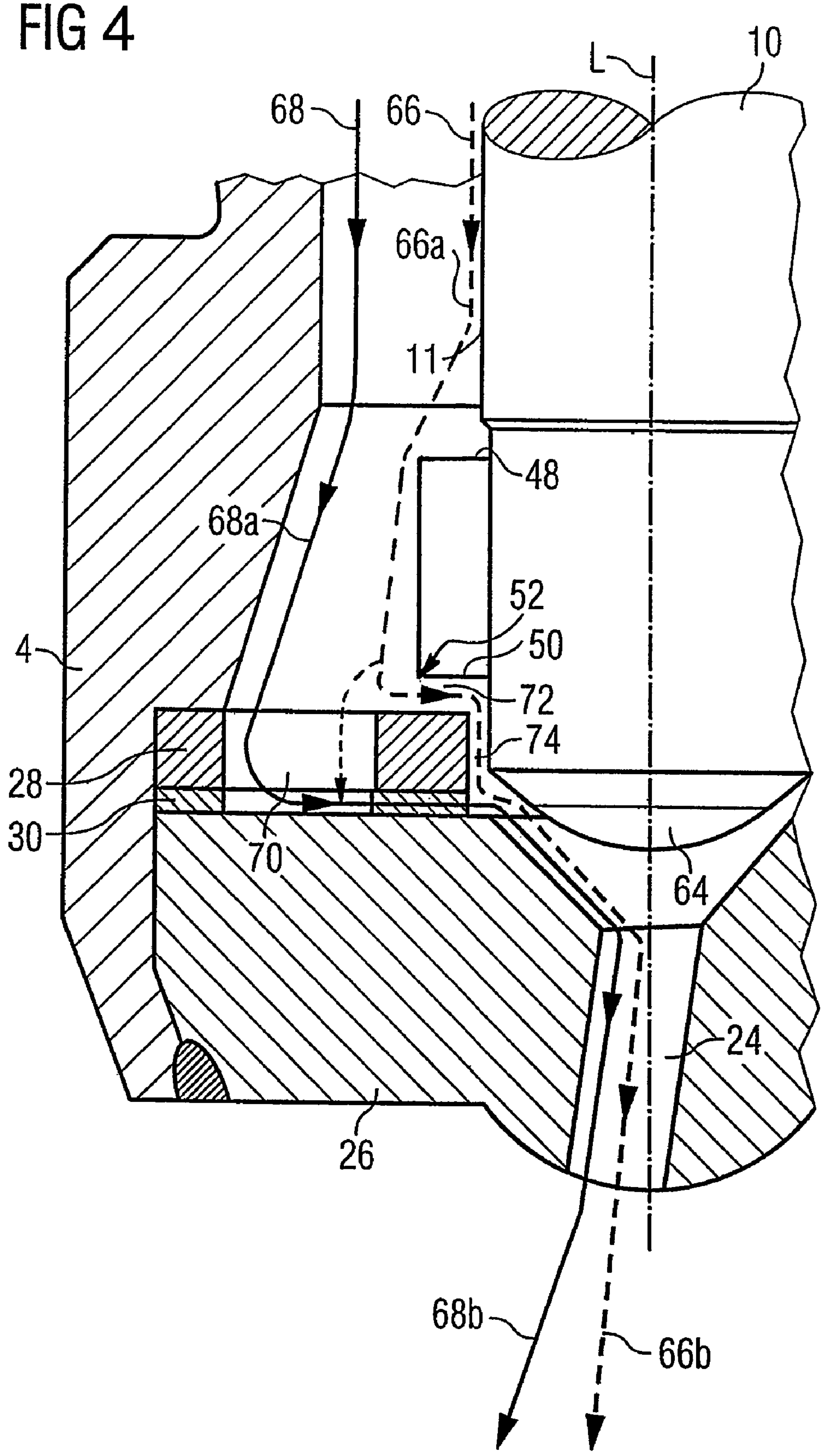
FIG. 4, an enlarged view of the valve assembly of the injection valve in a longitudinal section view, illustrating a cylindrical fluid flow directing element.

In further embodiments the fluid flow directing element can also have another shape, for example a cylindrical shape (e.g., FIG. 4), a semi-spherical shape or further shapes which allow the directing of the fluid flow away from the valve needle in radial direction and which make a reflux back to the valve needle difficult. To avoid the reflux back to the valve needle 10 the fluid flow directing element 46 preferably comprises an edge 52 which directs the fluid flow primarily through an orifice 70 of the lower guide 28 to the swirl disc 30.

The fluid flow directing element 46 is preferably press-fitted to the valve needle. This allows an exact positioning of the fluid flow directing element 46 relative to the valve needle 10. Furthermore, this embodiment is a low cost solution.

Alternatively, the fluid flow directing element 46 is welded to the valve needle 10, for example by spot-laser welding. This makes it possible to achieve a stable connection between the fluid flow directing element 46 and the valve needle 10. Furthermore, this connection is low cost solution.

In a further embodiment the valve needle 10 and fluid flow directing element 46 are forming a one-piece element. This has the advantage that the position of the fluid flow directing element 46 relative to the valve needle 10 can be defined very exactly. Furthermore, the stability of the connection between the valve needle 10 and the fluid flow directing element 46 is very high.

The valve assembly 60 comprises a first cavity section 54 upstream the fluid flow directing element 46 and a second cavity section 56 extending in radial direction away from the fluid flow directing element 46.

In the following, the function of the injection valve 10 being described in detail:

The fluid is led from the fluid inlet portion 42 to the fluid outlet portion 44. The axial position of the valve needle 10, which determines whether the fluid outlet portion 44 is opened or closed for a fluid flow, depends on the force balance between the spring and the forces applied to the valve needle 10 by the actuator unit with the coil 36.

The fluid flows through the fluid outlet portion 44 can be described with flow paths, in particular with a first flow path 66 and a second flow path 68 with flow path sections 66*a*, 66*b* and flow path sections 68*a*, 68*b* respectively.

The fluid flow on the first flow path 66 in the flow path section 66*a* near the surface 11 of the valve needle 10 is deflected by the fluid flow directing element 46 away from the valve needle 10 following the surface 47 of the fluid flow directing element 46. At the edge 52 the fluid flow on the first flow path 66 is split up.

The first of the split fluid flow parts enters a gap 72 between the fluid flow directing element 46 and the lower guide 28 and furthermore a gap 74 between the valve needle 10 and the lower guide 28 near the surface 11 of the valve needle 10. This reflux fluid flow back to the valve needle 10 is leaving the injection nozzle 24 in axial direction in the flow path section 66*b* of the first flow path 66.

The second of the split fluid flow parts through the orifice 70 of the lower guide 28 is unified with the fluid flow of the flow path section 68*a* of the second flow path 68 which represents the fluid flow distanced from the surface of the valve needle 10. The unified fluid flow on the flow path 68 is passing the swirl disc 30 thereby obtaining a radial velocity component which results in a distribution of droplets in a spray in the flow path section 68*b* of the second flow path 68.

Compared to a valve assembly 60 without a fluid flow directing element 46 the fluid flow leaving the injection nozzle 24 on the second fluid path 66 is increased by the amount of the second split fluid flow part unified with the fluid flow of the flow path section 66*a* of the second flow path 66. This means that the radial component of the fluid flow, represented by the fluid flow on the second flow path 66, can be increased and that the distribution of fluid in radial direction can be improved. Therefore the fluid flow through the injection nozzle 24 generating a spray can result in an increased spray angle and a good distribution of the droplets of the spray.

What is claimed is:

1. A valve assembly for an injection valve, comprising:

a valve body including a central longitudinal axis, the valve body comprising a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, a fluid flow directing element arranged in the fluid outlet portion coaxially between the valve body and the valve needle and extending in radial direction away from the valve needle in a way that a fluid flow between the valve needle and the fluid flow directing element is prevented, wherein the fluid flow directing element extends radially beyond an inner radius of a swirl disc located in the fluid outlet portion of the cavity, and a first structure arranged in the fluid outlet portion coaxially between the valve body and the valve needle and arranged downstream of the fluid flow directing element, wherein the valve body defines:

a first fluid flow path around the fluid flow directing element, through the swirl disk, and through an outlet opening; and a second fluid flow path around the fluid flow directing element, around the swirl disk, and through the outlet opening, wherein the first and second flow paths are separated by the first structure.

2. The valve assembly according to claim 1, wherein the fluid flow directing element has a downstream end portion which comprises an edge for directing the fluid flow.

3. The valve assembly according to claim 1, wherein the fluid flow directing element has a cylindrical shape.

4. The valve assembly according to claim 1, wherein the fluid flow directing element has a conical shape.

5. The valve assembly according to claim 1, wherein the fluid flow directing element is press-fitted to the valve needle.

6. The valve assembly according to claim 1, wherein the valve needle and the fluid flow directing element are forming a one-piece element.

7. An injection valve with a valve assembly, comprising:

a valve body including a central longitudinal axis, the valve body comprising a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, and a fluid flow directing element arranged in the fluid outlet portion coaxially between the valve body and the valve needle and extending in radial direction away from the valve needle in a way that a fluid flow between the valve needle and the fluid flow directing element is prevented, the fluid flow directing element extending axially from an upstream end to a downstream end, wherein a swirl disc is located in the fluid outlet portion of the cavity; the valve body defining:

a first fluid flow path around the fluid flow directing element and through a first passage between the downstream end of the fluid flow directing element and a first structure and by the swirl disc; and a second fluid flow path around the fluid flow directing element and by the swirl disc and through a second passage physically separated from the first passage by the first structure.

8. The injection valve according to claim 7, wherein the fluid flow directing element has a downstream end portion which comprises an edge for directing the fluid flow.

9. The injection valve according to claim 7, wherein the fluid flow directing element has a cylindrical shape.

10. The injection valve according to claim 7, wherein the fluid flow directing element has a conical shape.

11. The injection valve according to claim 7, wherein the fluid flow directing element is press-fitted to the valve needle.

12. The injection valve according to claim 7, wherein the valve needle and the fluid flow directing element are forming a one-piece element.

13. The injection valve according to claim 7, wherein:

the first passage passes through a swirl disk; and the second passage passes around the swirl disk.

14. A method of operating a valve assembly for an injection valve with a valve body including a central longitudinal axis, the valve body having a cavity with a fluid inlet portion and a fluid outlet portion, and a valve needle axially movable in the cavity, the valve needle preventing a fluid flow through the fluid outlet portion in a closing position and releasing the fluid flow through the fluid outlet portion in further positions, the method comprising the step of:

arranging a fluid flow directing element in the fluid outlet portion coaxially between the valve body and the valve needle which extends in radial direction away from the valve needle in such a way that a fluid flow between the valve needle and the fluid flow directing element is prevented, wherein the fluid flow directing element extends radially beyond an inner radius of a swirl disc located in the fluid outlet portion of the cavity, arranging a first structure in the fluid outlet portion coaxially between the valve body and the valve needle and arranged downstream of the fluid flow directing element, flowing fluid through a first fluid flow path around the fluid flow directing element, through the swirl disk, and through an outlet opening; and flowing fluid through a second fluid flow path around the fluid flow directing element, around the swirl disk, and through the outlet opening, and separating the first and second fluid flow paths with the first structure.

15. The method according to claim 14, wherein the fluid flow directing element has a downstream end portion which comprises an edge for directing the fluid flow.

16. The method according to claim 14, wherein the fluid flow directing element has a cylindrical shape.

17. The method according to claim 14, wherein the fluid flow directing element has a conical shape.

18. The method according to claim 14, wherein the fluid flow directing element is press-fitted to the valve needle.

19. The method according to claim 14, wherein the valve needle and the fluid flow directing element are forming a one-piece element.

* * * * *